Patented Mar. 13, 1923.

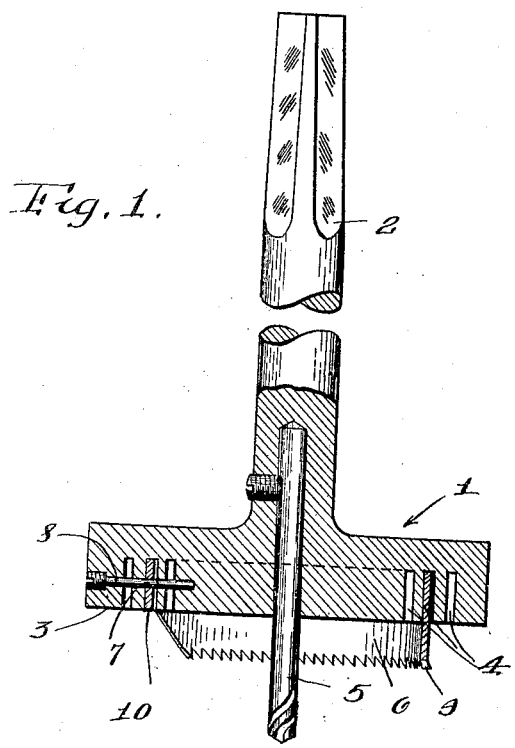
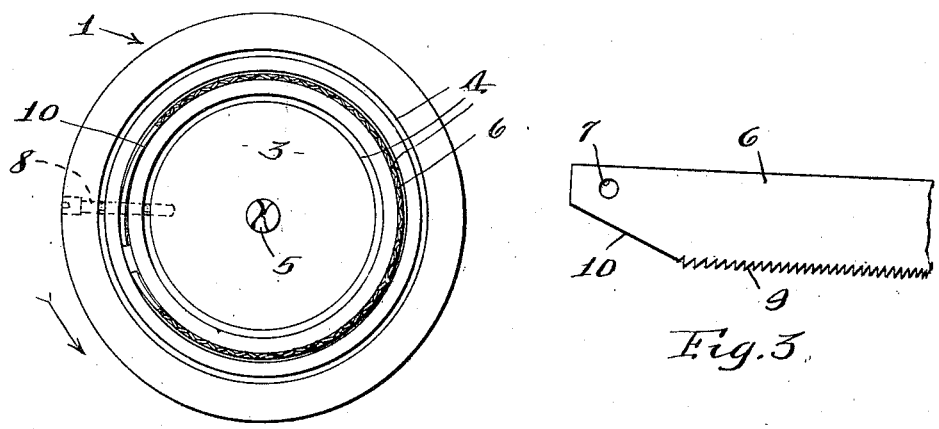

1,448,697

UNITED STATES PATENT OFFICE.

JOHN I. MISENER, OF SYRACUSE, NEW YORK, ASSIGNOR TO MISENER & IRVING MANUFACTURING CO., INC., OF SYRACUSE, NEW YORK, A CORPORATION OF NEW YORK.

CUTTING EDGE.

Application filed February 16, 1920. Serial No. 359,023.

*To all whom it may concern:*

Be it known that I, JOHN I. MISENER, a citizen of the United States, residing at Syracuse, in the county of Onondaga and State of New York, have invented a certain new and useful Cutting Edge, of which the following is a specification.

This invention has for its object a particularly simple and efficient cutting edge for metal cutting tools such as described in my Patent No. 1,283,258, October 29, 1918, for cutting circular holes in metal, and provides a cutting edge that readily conforms itself to the desired diameter to be cut, and removes a minimum amount of metal in performing the operation, and the invention consists in the novel features and in the combinations and constructions hereinafter set forth and claimed.
In describing this invention, reference is had to the accompanying drawings in which like characters designate corresponding parts in all the views.

Figure 1 is a sectional view, parts being shown in elevation, of a metal cutting tool embodying my cutting edge.

Figure 2 is an inverted plan view of parts shown in Fig. 1.

Figure 3 is an elevation of the forward end of the cutting edge.

This invention comprises, generally, a rotary head having a flat face with circular grooves therein, concentric with the axis of rotation of said head for holding an arc-shaped hacksaw from the front end thereof, the teeth on said hacksaw being removed or set back from the front end thereof.

In the drawing, 1 is the rotary head provided with a spindle 2 for clamping it in a device for rotating said head.

The head is preferably circular and is provided with a substantially flat face 3 disposed at a right angle to the rotation of said head. 4 are circular grooves formed in said flat face 3, concentric with the axis of rotation of the head 1. The face 3 is for convenience and for brevity's sake referred to in the specification and claims as flat and preferably is flat. 5 is a drill for forming a central bearing for the tool.

As here shown, the cutting edge 6 is an arc-shaped hacksaw, held from the front end thereof in one of the grooves 4, the grooves are of uniform depth and when the blade is inserted in said groove it is of sufficient width to extend beyond the flat face 3 of the head and the teeth or cutting surface of the saw are parallel to said flat face.

The grooves 4 as here shown are of greater width than the cutting edges 6 and the inner wall of each groove determines the diameter of the hole to be cut.

The cutting edges may be held from movement relatively to the rotation of the head 1 from the front end thereof in any desired manner, but preferably they are provided with an opening 7 in said front end and a pin 8 extends radially into the head 1 through the grooves 4 and through said opening 7.

For cheapness of production, the cutting edges are cut to the desired length from long coils of metal with the cutting edge or teeth thereon, the hole or opening 7 is then punched therein.

As it is desirable that the saw blade should conform closely to the inner wall of the groove 4 when in operation and that the teeth thereon should remove a minimum amount of metal during said operation, the advance corner portion of the saw in front of said teeth 9 are cut away, hence no part of the saw engages the work in advance of said teeth as shown at 10, Figs. 2 and 3 thereby allowing said cutting edge to perform its function with a minimum amount of labor and expense.

What I claim is:

1. A tool for cutting circular holes hacksaw having its teeth terminating short of one end and the edge beyond the teeth receding or inclining away from the toothed edge toward such end of the saw, in combination with a rotary holder having means for guiding the saw in an arc, such means engaging the inner concave face of the saw and means for securing the saw at said end whereby the saw trails and hugs along its concave face such guiding means, the securing means coacting with the saw at a point remote from the terminal teeth at the advance end of the saw whereby such terminal teeth engage the guiding means during trailing of the saw at a point in the rear of the securing means where the saw first engages or hugs the guiding means, substantially as and for the purpose described.

2. A circular trailing hacksaw for the purpose set forth and designed to be secured at its advance end, said saw having its teeth terminating short of such advance end and the advance corner portion of the saw in front of said teeth being cut away, whereby no part of the saw engages the work in advance of the teeth, substantially as and for the purpose specified.

In testimony whereof, I have hereunto signed my name at Syracuse, in the county of Onondaga, and State of New York, this 30th day of January, 1920.

JOHN I. MISENER.